(12) United States Patent
Oohira et al.

(10) Patent No.: US 8,663,798 B2
(45) Date of Patent: Mar. 4, 2014

(54) PRESSURE-SENSITIVE ADHESIVE OPTICAL FILM AND IMAGE DISPLAY

(75) Inventors: Kayo Oohira, Ibaraki (JP); Yuusuke Toyama, Ibaraki (JP); Masayuki Satake, Ibaraki (JP); Minoru Miyatake, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 813 days.

(21) Appl. No.: 11/958,818

(22) Filed: Dec. 18, 2007

(65) Prior Publication Data

US 2008/0143894 A1 Jun. 19, 2008

(30) Foreign Application Priority Data

Dec. 19, 2006 (JP) .................... 2006-341538
Jun. 27, 2007 (JP) .................... 2007-169524

(51) Int. Cl.
*B32B 7/12* (2006.01)
*G02F 1/1335* (2006.01)

(52) U.S. Cl.
USPC .............. 428/354; 428/343; 428/355 AC; 349/12

(58) Field of Classification Search
None
See application file for complete search history.

(56) References Cited

U.S. PATENT DOCUMENTS

| 5,712,336 A * | 1/1998 | Gareiss et al. ............. 524/373 |
| 2003/0097963 A1 * | 5/2003 | Schunk et al. ............ 106/170.11 |
| 2004/0209007 A1 | 10/2004 | Satake et al. |
| 2005/0014879 A1 | 1/2005 | Moroishi et al. |
| 2006/0108050 A1 | 5/2006 | Satake et al. |
| 2006/0121273 A1 * | 6/2006 | Toyama et al. ............. 428/343 |
| 2008/0274272 A1 | 11/2008 | Satake et al. |

FOREIGN PATENT DOCUMENTS

| JP | 8-95032 A | 4/1996 |
| JP | 2767382 B2 | 6/1998 |
| JP | 2003-49143 A | 2/2003 |
| TW | 200500657 | 10/1992 |
| TW | 200500720 | 4/1993 |

OTHER PUBLICATIONS

Taiwanese Office Action dated Dec. 2, 2011, issued in corresponding Taiwanese Patent Application No. 096148488, with English Translation.

* cited by examiner

*Primary Examiner* — Callie Shosho
*Assistant Examiner* — Cheng Huang
(74) *Attorney, Agent, or Firm* — Westerman, Hattori, Daniels & Adrian, LLP

(57) ABSTRACT

A pressure-sensitive adhesive optical film of the present invention comprises: an optical film comprising a transparent base film and an optical compensation liquid crystal layer provided on one side of the transparent base film; a pressure-sensitive adhesive layer provided on the optical compensation liquid crystal layer; and an undercoat layer that is interposed between the optical compensation liquid crystal layer and the pressure-sensitive adhesive layer and contains a polymer and an antioxidant. The pressure-sensitive adhesive optical film can suppress window frame unevenness when a backlight is turned on.

1 Claim, 1 Drawing Sheet

PRESSURE-SENSITIVE ADHESIVE OPTICAL FILM AND IMAGE DISPLAY

BACKGROUND OF THE INVENTION

1. Field of the Invention

The present invention relates to a pressure-sensitive adhesive optical film. The present invention also relates to an image display, such as a liquid crystal display, an organic electroluminescent display, a cathode ray tube (CRT), and a plasma display panel (PDP), using the pressure-sensitive adhesive optical film.

The pressure-sensitive adhesive optical film of the present invention has an optical compensation liquid crystal layer and is useful as an optical compensation film to improve display contrast and the viewing angle characteristics of displayed colors. In particular, the pressure-sensitive adhesive optical film having a polarizer laminated therein is useful as an elliptically polarizing plate with the function of optical compensation. When the optical compensation liquid crystal layer is a discotic liquid crystal layer comprising an aligned discotic liquid crystal compound, the pressure-sensitive adhesive optical film of the present invention is particularly useful.

2. Description of the Related Art

The liquid crystal display market has rapidly expanded in such fields as clocks, mobile phones, PDAs, note PCs, PC monitors, DVD players, and TVs. Liquid crystal displays use liquid crystal switching to visualize changes in polarization state, and based on the display principle, they use polarizers. Particularly in TV applications and the like, there is an increasing demand for high brightness and high contrast display, and thus brighter (higher transmittance) and higher contrast (higher degree of polarization) polarizers have been developed and introduced.

The currently dominating type of general liquid crystal displays is a TFT-LCD using a TN liquid crystal. This type has the advantages of a high response speed and a capability of producing high contrast. However, if displays on TN liquid crystal panels are viewed at angles oblique to the normal direction, their contrast can be significant low, or gradation reversal, an event in which the gradation of displays is inverted, or the like can take place. Thus, TN liquid crystals have very narrow viewing angle characteristics. On the other hand, applications such as large PC monitors and large screen televisions should satisfy certain requirements such as high contrast, wide viewing angle, and little fluctuation in display colors over viewing angles. Thus, TN mode TFT-LCDs for use in such applications must have a retardation film for compensating for viewing angles.

Conventionally, stretched birefringent polymer films have been used as the retardation film. Recently, it has been proposed that the optical compensation film made of such a stretched birefringent film is replaced with another optical compensation film having an optically anisotropic layer formed of a liquid crystalline molecule on a transparent support. Since liquid crystalline molecules can have various orientation modes, the use of liquid crystalline molecules has enabled the achievement of certain optical properties that had not been achieved with conventional stretched birefringent polymer films.

For example, one of the proposed retardation films for viewing angle compensation is Wide View Film manufactured by Fuji Photo Film Co., Ltd., which uses a discotic liquid crystal with negative refractive index anisotropy (see JP-A No. 08-95032 and JP-B No. 2767382). This retardation film includes a transparent base film and a discotic liquid crystal layer that is provided on one side of the base film and has an obliquely-oriented optical axis. The main purpose of this retardation film is to improve viewing angle characteristics in a state where a certain voltage for black viewing is applied. Specifically, in a state where a certain voltage is applied, a liquid crystal molecule in a liquid crystal cell shows positive refractive index anisotropy with an optical axis tilted with respect to a glass substrate. In order to compensate for the retardation caused by this refractive index anisotropy, the retardation film uses a liquid crystalline molecule having an optical axis tilted with respect to the film normal direction and having negative refractive index anisotropy.

In the retardation film for viewing angle compensation, a polarizer is laminated on the transparent base film to form an elliptically polarizing plate, and a pressure-sensitive adhesive is laminated on the discotic liquid crystal layer. The pressure-sensitive adhesive optical film having the pressure-sensitive adhesive layer laminated therein and serving as a retardation film, an elliptically polarizing plate, or the like is bonded to a liquid crystal cell or the like through the pressure-sensitive adhesive layer. The above-mentioned retardation film for viewing angle compensation or the above-mentioned elliptically polarizing plate may be bonded to a liquid crystal cell or the like through the pressure-sensitive adhesive layer to form a liquid crystal display. When used in combination with a backlight in a lighting state, however, such a liquid crystal display has a problem in which unevenness occurs in the vicinity of the frame of the liquid crystal display (hereinafter, this is referred to as "window frame unevenness") to reduce visibility. Particularly when the temperature is high or when the size of the liquid crystal display is large, the window frame unevenness becomes significant.

The elliptically polarizing plate or the like may be bonded to a liquid crystal cell or the like through the pressure-sensitive adhesive layer to form a liquid crystal display. When held under heated conditions, such a liquid crystal display causes a problem in which hue becomes different between the central and peripheral portions of the polarizer (hereinafter, this is referred to as "picture frame-like unevenness"). The picture frame-like unevenness and the window frame unevenness occur as different phenomena. In order to avoid the picture frame-like unevenness, for example, it is proposed that an antioxidant (0.001 to 3 parts by weight, based on 100 parts by weight of a base polymer) should be added to the pressure-sensitive adhesive layer (JP-A No. 2003-49143). However, even if the picture frame-like unevenness is avoided by the addition of an antioxidant to the pressure-sensitive adhesive layer, the problem of the window frame unevenness cannot be solved.

SUMMARY OF THE INVENTION

It is an object of the present invention to provide a pressure-sensitive adhesive optical film that includes a transparent base film, an optical compensation liquid crystal layer provided on one side of the transparent base film and a pressure-sensitive adhesive layer laminated on the optical compensation liquid crystal layer and in which window frame unevenness can be suppressed when a backlight is turned on.

It is another object of the present invention to provide an image display using such a pressure-sensitive adhesive optical film.

As a result of investigation for solving the problems, the inventors have found that the objects can be achieved with the pressure-sensitive adhesive optical film described below, and has finally completed the present invention.

The present invention relates to a pressure-sensitive adhesive optical film, comprising:

an optical film comprising a transparent base film and an optical compensation liquid crystal layer provided on one side of the transparent base film;

a pressure-sensitive adhesive layer provided on the optical compensation liquid crystal layer; and an undercoat layer that is interposed between the optical compensation liquid crystal layer and the pressure-sensitive adhesive layer and contains a polymer and an antioxidant.

In the pressure-sensitive adhesive optical film, undercoat layer preferably contains 100 parts by weight of the polymer and 0.01 to 1000 parts by weight of the antioxidant. Particularly, the undercoat layer preferably contains 100 parts by weight of the polymer and 5 to 1000 parts by weight of the antioxidant.

The pressure-sensitive adhesive optical film is preferably applied, when the optical compensation liquid crystal layer is a discotic liquid crystal layer.

In the pressure-sensitive adhesive optical film, the polymer of the undercoat layer preferably has a primary amino group. Further, polymer having the primary amino group is preferably a poly (meth)acrylate having a primary amino group at its end.

In the pressure-sensitive adhesive optical film, the antioxidant is preferably at least one selected from a phenolic antioxidant, a phosphorus antioxidant, a sulfur antioxidant, and an amine antioxidant.

In the pressure-sensitive adhesive optical film, the pressure-sensitive adhesive layer is preferably made of an acrylic pressure-sensitive adhesive containing an acrylic polymer and a crosslinking agent, and the crosslinking agent comprises a peroxide.

In the pressure-sensitive adhesive optical film, the optical film further may comprise a polarizer laminated on one side of the transparent base film where the optical compensation liquid crystal layer is not formed.

The present invention also relates to an image display, comprising at least one piece of the above pressure-sensitive adhesive optical film.

According to conventional technique, the front retardation value becomes larger at the window frame area than at the center area in a liquid crystal display using a pressure-sensitive adhesive optical film having an optical compensation liquid crystal layer functioning as an optical compensation layer, when a backlight is turned on for a long time, so that window frame unevenness occurs. In the pressure-sensitive adhesive optical film of the present invention, the pressure-sensitive adhesive layer is provided on the optical compensation liquid crystal layer with the undercoat layer containing a polymer and an antioxidant and being interposed therebetween, so that the undercoat layer can suppress window frame unevenness, which would otherwise be caused by an increase in front retardation at the window frame area. Window frame unevenness tends to occur when the optical compensation liquid crystal layer is a discotic liquid crystal layer. Thus, the present invention is particularly effective when a discotic liquid crystal layer is used as the optical compensation layer.

Window frame unevenness tends to occur in a relatively large liquid display. Thus, the pressure-sensitive adhesive optical film of the present invention is particularly effective for large-sized pressure-sensitive adhesive optical films. Window frame unevenness also tends to occur at high environmental temperature. Thus, the pressure-sensitive adhesive optical film of the present invention is particularly effective for pressure-sensitive adhesive optical films for use in a high temperature environment.

The pressure-sensitive adhesive optical film of the present invention is suited for a case where the pressure-sensitive adhesive layer is made of an acrylic pressure-sensitive adhesive containing an acrylic polymer and a crosslinking agent, and a peroxide is used as the crosslinking agent. When a peroxide is used as the crosslinking agent for the pressure-sensitive adhesive, a small amount of the peroxide remaining in the pressure-sensitive adhesive layer or an acid or the like produced by the decomposition of the peroxide can affect the optical compensation liquid crystal layer to cause window frame unevenness. In the pressure-sensitive adhesive optical film of the present invention, however, the undercoat layer contains an antioxidant, which blocks the effect of the remaining peroxide, acid or the like on the optical compensation liquid crystal layer, so that window frame unevenness can be suppressed.

DETAILED DESCRIPTION OF THE PREFERRED EMBODIMENTS

Figure 1:
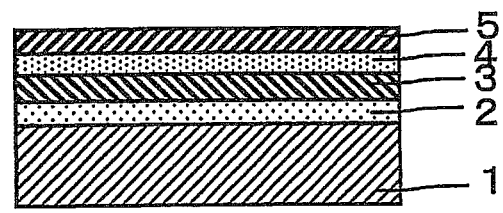
FIG. 1 is a cross-sectional view of an example of the pressure-sensitive adhesive optical film of the present invention.

The present invention is described below with reference to the drawings. As shown in FIG. 1, the pressure-sensitive adhesive optical film of the present invention includes a transparent base film 1, an optical compensation liquid crystal layer 3, for example, a discotic liquid crystal layer, provided on one side of the base film 1, and a pressure-sensitive adhesive layer 5 provided on the optical compensation liquid crystal layer 3 with an undercoat layer 4 interposed therebetween. While FIG. 1 illustrates a case where an alignment film 2 is placed between the transparent base film 1 and the optical compensation liquid crystal layer 3, one side of the transparent base film 1 may be subjected to rubbing treatment, instead of providing the alignment film 2.

Figure 2:
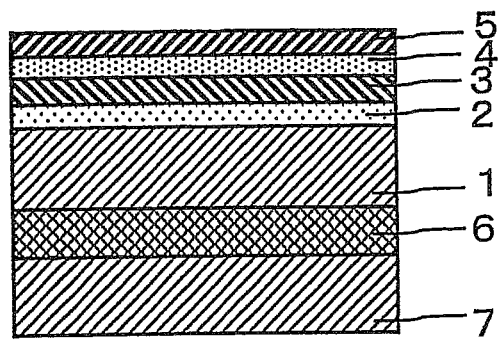
FIG. 2 is a cross-sectional view of another example of the pressure-sensitive adhesive optical film of the present invention.

FIG. 2 shows a case where the pressure-sensitive adhesive optical film of FIG. 1 further includes a polarizer 6 and a transparent protective film 7 that are laminated in this order on one side of the transparent base film 1 where the optical compensation liquid crystal layer 3 is not formed. In FIG. 2, the transparent base film 1 also serves as a transparent protective film for the polarizer 6.

Various types of transparent materials may be used for the transparent base film. For example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming the base film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; arylate type polymers; polyoxymethylene type polymers; epoxy type polymers; or blend polymers of the above-mentioned polymers may be mentioned.

Moreover, as is described in Japanese Patent Laid-Open Publication No. 2001-343529 (WO 01/37007), polymer films, for example, resin compositions including (A) thermoplastic resins having substituted and/or non-substituted imido group is in side chain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used.

In general, a thickness of the transparent base film, which can be determined arbitrarily, is 1 to 500 μm, especially 5 to 200 μm in viewpoint of strength, work handling and thin layer.

The transparent base film is preferably as colorless as possible. Thus, the transparent base is preferably used which has a film-thickness-direction retardation of −90 nm to +75 nm, wherein the retardation (Rth) is represented by the formula: $Rth=[(nx+ny)/(2-nz)]d$, wherein nx and ny are each a principal refractive index in the plane of the film, nz is a refractive index in the film-thickness direction, and d is the thickness of the film. If the transparent base with such a thickness-direction retardation value (Rth) of −90 nm to +75 nm is used, coloring (optical coloring) of the polarizing plate can be almost avoided, which could otherwise be caused by any other transparent base film. The thickness-direction retardation (Rth) is more preferably from −80 nm to +60 nm, particularly preferably from −70 nm to +45 nm.

As the transparent base film, if polarization property and durability are taken into consideration, cellulose based polymer, such as triacetyl cellulose and norbornene based polymer, are preferable, and especially cellulose based polymer, such as triacetyl cellulose is suitable.

For example, the optical compensation liquid crystal layer is formed using a polymerizable liquid crystal monomer and/or a liquid crystal polymer. The polymerizable liquid crystal monomer and/or the liquid crystal polymer may be applied to the transparent base film and then aligned and cured (solidified) to form an optical compensation liquid crystal layer. When the polymerizable liquid crystal monomer is used, a photopolymerization initiator is generally used. Any type of photopolymerization initiator may be used without limitation.

The optical compensation layer may be a discotic liquid crystal layer, which may be formed by aligning a discotic liquid crystal compound having a polymerizable unsaturated group and curing it. The discotic liquid crystal layer is useful as an optical compensation layer and can increase viewing angle, contrast, brightness, and the like. The discotic liquid crystal compound having a polymerizable unsaturated group can form a discotic liquid crystal layer, when the compound is aligned and cured. In a preferred mode, the discotic liquid crystal compound is obliquely aligned in the discotic liquid crystal layer. The thickness of the discotic liquid crystal layer is generally from about 0.5 to about 10 μm.

Discotic liquid crystal compounds have negative refractive index anisotropy (uniaxiality). Examples thereof include benzene derivatives as described in the research report by C. Destrade et al., Mol. Cryst. vol. 71, p. 111 (1981); cyclohexane derivatives as described in the research report by B. Kohne et al., Angew. Chem., vol. 96, p. 70 (1984); and aza-crown or phenylacetylene type macrocyclic compounds as described in the research report by J. M. Lehn et al., J. Chem. Commun., p. 1794 (1985) and the research report by J. Zhang et al., J. Am. Chem. Soc., vol. 116, p. 2655 (1994). Discotic liquid crystal compounds may generally have a structure in which any of them forms a core at the center of the molecule and has radially provided straight substituents such as straight alkyl or alkoxy groups and substituted benzoyloxy groups. Discotic liquid crystal compounds include compounds that exhibit liquid crystal properties and are generally called "discotic liquid crystal." It will be understood that discotic liquid crystal compounds are not limited to the above and include any molecule that has negative uniaxiality and can be oriented in a certain degree. In the present invention, the discotic liquid crystal compound may have a polymerizable unsaturated group, such as an acryloyl, methacryloyl, vinyl, or allyl group, and capable of causing a curing reaction by means of heat, light or the like. In the discotic liquid crystal layer, the final product is not necessarily the above-described compound and may include substances that have been polymerized or crosslinked by the reaction of the polymerizable unsaturated group and lost the liquid crystal properties by polymerization.

Discotic liquid crystal compounds encompasses not only various types of discotic liquid crystal compounds but also the whole of compounds whose molecule has optically-negative uniaxiality by itself, such as reaction products of discotic liquid crystals, which have already lost liquid crystal properties due to reaction with any other low-molecular-weight compound or polymer.

Alignment treatment of the discotic liquid crystal may be performed by rubbing the surface of the transparent base film or using an alignment film. Examples of the alignment film include obliquely vapor-deposited inorganic films and specific rubbed organic polymer films. Examples thereof also include thin films in which molecules are isomerized by light and uniformly arranged in a certain direction, such as LB films comprising azobenzene derivatives. Examples of organic alignment films include polyimide films and organic polymer films having a hydrophobic surface, such as alkyl chain-modified polyvinyl alcohol, polyvinyl butyral, or poly methylmethacrylate. Obliquely vapor-deposited inorganic films include obliquely vapor-deposited SiO films.

The discotic liquid crystal compound may be obliquely aligned. For example, a method that may be used for the alignment includes forming an alignment film on the transparent base film, then applying the discotic liquid crystal compound, which is polymerizable liquid crystal compound, thereto so that the compound is obliquely aligned, and then fixing the compound by application of light such as ultraviolet light or heat. Alternatively, the discotic liquid crystal may be obliquely aligned on any other alignment substrate and then transferred to the transparent support by the use of an optically-transparent adhesive or pressure-sensitive adhesive to form the discotic liquid crystal compound.

The discotic liquid crystal layers disclosed in Patent Literature (JP-A No. 08-95032 and JP-B No. 2767382) are preferably used. Wide View films manufactured by Fuji Photo Film Co., Ltd. have such an obliquely-aligned discotic liquid crystal layer formed on a cellulose polymer film.

Alternatively, the optical compensation liquid crystal layer may be made of or from a nematic liquid crystalline monomer and/or polymer.

The nematic liquid crystalline monomer may have a polymerizable functional group such as an acryloyl or methacryloyl group at its end and also have a mesogenic group comprising a cyclic unit or the like. Two or more acryloyl or methacryloyl groups may also be used as polymerizable functional groups so that a crosslinked structure can be introduced to increase durability. Examples of the cyclic unit that can form the mesogenic group include biphenyl type units, phenylbenzoate type units, phenylcyclohexane type units, azoxybenzene type units, azomethine type units, azobenzene type units, phenylpyrimidine type units, diphenylacetylene type units, diphenylbenzoate type units, bicyclohexane type units, cyclohexylbenzene type units, and terphenyl type units. These cyclic units may have a substituent such as a cyano, alkyl, alkoxy, or halogen group at their end.

Examples of main chain type liquid crystal polymers include condensation type polymers structured to have a mesogenic group comprising an aromatic unit or the like, such as polyester type polymers, polyamide type polymers, polycarbonate type polymers, and polyesterimide type polymers. Examples of the aromatic unit that can form the mesogenic group include phenyl type units, biphenyl type units and naphthalene type units. These aromatic units may have a substituent such as a cyano, alkyl, alkoxy, or halogen group.

Examples of side chain type liquid crystal polymers include polymers having a skeleton of a polyacrylate, polymethacrylate, polysiloxane, or polymalonate type main chain and having a mesogenic group comprising a cyclic unit or the like in a side chain. Examples of the cyclic unit that can form the mesogenic group include biphenyl type units, phenylbenzoate type units, phenylcyclohexane type units, azoxybenzene type units, azomethine type units, azobenzene type units, phenylpyrimidine type units, diphenylacetylene type units, diphenylbenzoate type units, bicyclohexane type units, cyclohexylbenzene type units, and terphenyl type units. These cyclic units may have a substituent such as a cyano, alkyl, alkoxy, or halogen group at their end.

The mesogenic group of any of the polymerizable liquid crystal monomer and the liquid crystal polymer may be bonded through a spacer moiety for imparting flexibility. The spacer moiety may be a polymethylene chain, a polyoxymethylene chain or the like. The number of structural units that are repeated to form the spacer moiety may be appropriately determined depending on the chemical structure of the mesogenic moiety. For example, the number of repeating units in a polymethylene chain may be from 0 to 20, preferably from 2 to 12, and the number of repeating units in a polyoxymethylene chain may be from 0 to 10, preferably from 1 to 3.

The nematic liquid crystal monomer or the liquid crystal polymer may be mixed with a cholesteric liquid crystalline monomer or a chiral agent so as to show a cholesteric phase in a liquid crystal state. A cholesteric liquid crystalline polymer may also be used. The resulting cholesteric liquid crystal phase may be used to form a selective reflection film. Any chiral agent that has an optically-active group and does not disturb the orientation of the nematic liquid crystalline monomer or the like may be used. While chiral agents may have or not have liquid crystal properties, chiral agents that exhibit cholesteric liquid crystal properties are preferably used. The chiral agent to be used may have or not have a reactive group. In view of the heat resistance or solvent resistance of the cholesteric liquid crystal orientation film obtained by curing, reactive group-containing chiral agents are preferred. Examples of the reactive group include acryloyl, methacryloyl, azide, and epoxy groups.

The liquid crystal monomer or the liquid crystal polymer may be spread on the alignment film. Any of various known conventional alignment films may be used. Examples of alignment films that may be used include a product produced by a method including the steps of forming a thin film of polyimide, polyvinyl alcohol or the like on a transparent substrate and rubbing the thin film, a stretched film produced by stretching a transparent film, and a product produced by applying polarized ultraviolet light to polyimide or a polymer having a cinnamate skeleton or an azobenzene skeleton.

The undercoat layer is made of an undercoating agent containing a polymer and an antioxidant. In a preferred mode, the polymer material shows good adhesion to both the pressure-sensitive adhesive layer and the optical compensation liquid crystal layer and can form a coating film with high cohesiveness.

Examples of the polymer include polyurethane resins, polyester resins, and polymers having an amino group in their molecule. The polymer to be used may be in any of a solvent-soluble form, a water-dispersible form and a water-soluble form. For example, water-soluble polyurethanes, water-soluble polyesters, water-soluble polyamides, and the like, and water-dispersible resins, such as ethylene-vinyl acetate copolymer emulsions and (meth)acrylic polymer emulsions, may be used. Water-dispersible types that may be used include emulsions produced by emulsifying various resins such as polyurethanes, polyesters and polyamides with an emulsifying agent; and self-emulsified products produced by introducing a water-dispersible hydrophilic anionic, cationic or nonionic group into any of the above resins. Ionic polymer complexes may also be used.

When the pressure-sensitive adhesive layer contains an isocyanate compound, the polymer preferably has a functional group reactive with the isocyanate compound. Such a polymer preferably has an amino group in its molecule. In particular, a polymer having a primary amino group at its end is preferably used. Such a polymer reacts with the isocyanate compound to produce strong adhesion. The polymer having a primary amino group at its end is preferably a poly (meth) acrylate having a primary amino end group.

Examples of the polymer having an amino group in its molecule include polyethyleneimines, polyallylamines, polyvinylamines, polyvinylpyridines, polyvinylpyrrolidines, and polymers of amino group-containing monomers such as dimethylaminoethyl acrylate. In particular, polyethyleneimines are preferred. Any type of polyethyleneimine material having a polyethyleneimine structure may be used, and examples thereof include polyethyleneimine and ethyleneimine adducts and/or polyethyleneimine adducts of polyacrylate. Particularly preferred are ethyleneimine adducts and/or polyethyleneimine adducts of polyacrylate, which are poly (meth)acrylates having a primary amino end group.

Various types of polyethyleneimine may be used without limitation. The weight average molecular weight of the polyethyleneimine is generally, but not limited to, from about 100 to about 1,000,000. Commercially available examples of the polyethyleneimine include Epomin SP series (such as SP-003, SP006, SP012, SP018, SP103, SP110, and SP200) and Epomin P-1000 manufactured by Nippon Shokubai Co., Ltd. Epomin P-1000 is particularly preferred.

Ethyleneimine adducts and/or polyethyleneimine adducts of polyacrylate may be obtained by emulsion polymerization of alkyl (meth)acrylate for forming a base polymer (acrylic polymer) of the acrylic pressure-sensitive adhesive described later and another monomer copolymerizable therewith in a conventional manner. The copolymerizable monomer to be used has a functional group such as a carboxyl group such that it can react with ethyleneimine or the like. The content of the monomer having such a functional group as carboxyl may be appropriately adjusted depending on the content of ethyleneimine or the like for the reaction. A styrene type monomer is preferably used as the copolymerizable monomer. The carboxyl group or the like in an acrylate may be allowed to react with a separately synthesized polyethyleneimine so that adducts grafted with polyethyleneimine can be produced.

Commercially available examples thereof include Polyment NK-380 manufactured by Nippon Shokubai Co., Ltd.

Ethyleneimine adducts and/or polyethyleneimine adducts of acrylic polymer emulsions may also be used. Commercially available examples thereof include Polyment SK-1000 manufactured by Nippon Shokubai Co., Ltd.

Other examples of the polymer having a primary amino end group include products by a process including the steps of allowing excess diisocyanate to react with a carboxyl or hydroxyl group in polyacrylate and allowing excess diamine to react with it to introduce a primary amino end group. Poly(meth)acrylate having a primary amino end group may also be obtained by copolymerizing the (meth)acrylate with a monomer having a primary amino end group. Examples of the monomer having a primary amino end group include aminoethyl (meth)acrylate and aminopropyl (meth)acrylate.

Examples of the antioxidant contained in the undercoat layer include a phenolic antioxidant, a phosphorus antioxidant, a sulfur antioxidant, and an amine antioxidant, and at least one selected from these antioxidants may be used. In particular, a phenolic antioxidant is preferred.

Examples of the phenolic antioxidant include monocyclic phenol compounds such as 2,6-di-tert-butyl-p-cresol, 2,6-di-tert-butyl-4-ethylphenol, 2,6-dicyclohexyl-4-methylphenol, 2,6-diisopropyl-4-ethylphenol, 2,6-di-tert-amyl-4-methylphenol, 2,6-di-tert-octyl-4-n-propylphenol, 2,6-dicyclohexyl-4-n-octylphenol, 2-isopropyl-4-methyl-6-tert-butylphenol, 2-tert-butyl-4-ethyl-6-tert-octylphenol, 2-isobutyl-4-ethyl-6-tert-hexylphenol, 2-cyclohexyl-4-n-butyl-6-isopropylphenol, a mixed cresol modified with styrene, DL-α-tocopherol, and stearyl β-(3,5-di-tert-butyl-4-hydroxyphenyl)propionate; bicyclic phenol compounds such as 2,2'-methylenebis(4-methyl-6-tert-butylphenol), 4,4'-butylidenebis(3-methyl-6-tert-butylphenol), 4,4'-thiobis(3-methyl-6-tert-butylphenol), 2,2'-thiobis(4-methyl-6-tert-butylphenol), 4,4'-methylenebis(2,6-di-tert-butylphenol), 2,2'-methylenebis[6-(1-methylcyclohexyl)-p-cresol], 2,2'-ethylidenebis(4,6-di-tert-butylphenol), 2,2'-butylidenebis(2-tert-butyl-4-methylphenol), 3,6-dioxaoctamethylenebis[3-(3-tert-butyl-4-hydroxy-5-methylphenyl)propionate], triethyleneglycol bis[3-(3-tert-butyl-5-methyl-4-hydroxyphenyl)propionate], 1,6-hexanediol bis[3-(3,5-di-tert-butyl-4-hydroxyphenyl)propionate], and 2,2'-thiodiethylenebis[3-(3,5-di-tert-butyl-4-hydroxyphenyl)propionate]; tricyclic phenol compounds such as 1,1,3-tris(2-methyl-4-hydroxy-5-tert-butylphenyl)butane, 1,3,5-tris(2,6-dimethyl-3-hydroxy-4-tert-butylbenzyl)isocyanurate, 1,3,5-tris[(3,5-di-tert-butyl-4-hydroxyphenyl)propionyloxyethyl]isocyanurate, tris(4-tert-butyl-2,6-dimethyl-3-hydroxybenzyl)isocyanurate, and 1,3,5-trimethyl-2,4,6-tris(3,5-di-tert-butyl-4-hydroxybenzyl)benzene; tetracyclic phenol compounds such as tetrakis[methylene-3-(3,5-di-tert-butyl-4-hydroxyphenyl)propionate]methane; and phosphorus-containing phenol compounds such as potassium bis(ethyl 3,5-di-tert-butyl-4-hydroxybenzylphosphonate) and nickel bis(ethyl 3,5-di-tert-butyl-4-hydroxybenzylphosphonate).

Examples of the phosphorus antioxidant include trioctyl phosphite, trilauryl phosphite, tristridecyl phosphite, trisisodecyl phosphite, phenyl diisooctyl phosphite, phenyl diisodecyl phosphite, phenyl di(tridecyl) phosphite, diphenyl isooctyl phosphite, diphenyl isodecyl phosphite, diphenyl tridecyl phosphite, triphenyl phosphite, tris(nonylphenyl) phosphite, tris(2,4-di-tert-butylphenyl) phosphite, tris(butoxyethyl) phosphite, tetramidecyl-4,4'-butylidenebis(3-methyl-6-tert-butylphenyl)diphosphite, 4,4'-isopropylidenediphenol alkyl phosphite (wherein the alkyl group has about 12 to about 15 carbon atoms), 4,4'-isopropylidenebis(2-tert-butylphenol)di(nonylphenyl) phosphite, tris(biphenyl) phosphite, tetra(tridecyl)-1,1,3-tris(2-methyl-5-tert-butyl-4-hydroxyphenyl)butane diphosphite, tris(3,5-di-tert-butyl-4-hydroxyphenyl) phosphite, hydrogenated 4,4'-isopropylidenediphenol polyphosphite, bis(octylphenyl)bis [4,4'-butylidenebis(3-methyl-6-tert-butylphenol)]1,6-hexanediol diphosphite, hexatridecyl-1,1,3-tris(2-methyl-4-hydroxy-5-tert-butylphenyl)diphosphite, tris[4,4'-isopropylidenebis(2-tert-butylphenol)]phosphite, tris(1,3-distearoyloxyisopropyl)phosphite, 9,10-dihydro-9-phosphaphenanthrene-10-oxide, tetrakis(2,4-di-tert-butylphenyl)-4,4'-biphenylene diphosphonite, distearyl pentaerythritol diphosphite, di(nonylphenyl)pentraerythritol diphosphite, phenyl 4,4,'-isopropylidenediphenol pentaerythritol diphosphite, bis(2,4-di-tert-butylphenyl)pentaerythritol diphosphite, bis(2,6-di-tert-butyl-4-methylphenyl)pentaerythritol diphosphite, and phenylbisphenol-A-pentaerythritol diphosphite.

Dialkyl thiodipropionates and polyhydric alcohol esters of alkylthiopropionic acid are preferably used as sulfur antioxidants. Dialkyl thiodipropionates having an alkyl group of 6 to 20 carbon atoms are preferably used in the present invention. Polyhydric alcohol esters of alkylthiopropionic acid preferably have an alkyl group of 4 to 20 carbon atoms. In this case, examples of the polyhydric alcohol for forming the polyhydric alcohol esters include glycerol, trimethylolethane, trimethylolpropane, pentaerythritol, and trishydroxyethyl isocyanurate. Examples of such dialkyl thiodipropionates include dilauryl thiodipropionate, dimyristyl thiodipropionate and distearyl thiodipropionate. Examples of polyhydric alcohol esters of alkylthiopropionic acid include glycerol tributylthiopropionate, glycerol trioctylthiopropionate, glycerol trilaurylthiopropionate, glycerol tristearylthiopropionate, trimethylolethane tributylthiopropionate, trimethylolethane trioctylthiopropionate, trimethylolethane trilaurylthiopropionate, trimethylolethane tristearylthiopropionate, pentaerythritol tetrabutylthiopropionate, pentaerythritol tetraoctylthiopropionate, pentaerythritol tetralaurylthiopropionate, and pentaerythritol tetrastearylthiopropionate.

Examples of the amine antioxidant include bis(2,2,6,6-tetramethyl-4-piperidyl)sebacate, polycondensates of dimethyl succinate and 1-(2-hydroxyethyl)-4-hydroxy-2,2,6,6-tetramethylpiperidineethanol, N,N',N'',N'''-tetrakis(4,6-bis (butyl-(N-methyl-2,2,6,6-tetramethylpiperidine-4-yl) amino)-triazine-2-yl)-4,7-diazadecane-1,10-diamine, polycondensates of dibutylamine-1,3,5-triazine-N,N'-bis(2,2,6,6-tetramethyl-4-piperidyl)-1,6-hexamethylenediamine and N-(2,2,6,6-tetramethyl-4-piperidyl)butylamine, poly [{6-1,1,3,3-tetramethylbutyl)amino-1,3,5-triazine-2,4-diyl}{(2,2,6,6-tetramethyl-4-piperidyl)
imino}hexamethylene{(2,2,6,6-tetramethyl-4-piperidyl) imino}], tetrakis(2,2,6,6-tetramethyl-4-piperidyl)-1,2,3,4-butanetetracarboxylate, 2,2,6,6-tetramethyl-4-piperidyl benzoate, bis(1,2,6,6-pentamethyl-4-piperidyl)-2-(3,5-di-tert-butyl-4-hydroxybenzyl)-2-n-butyl malonate, bis(N-methyl-2,2,6,6-tetramethyl-4-piperidyl) sebacate, 1,1'-(1,2-ethanediyl)-bis(3,3,5,5-tetramethylpiperadinone), (mixed 2,2,6,6-tetramethyl-4-piperidyl/tridecyl)-1,2,3,4-butanetetracarboxylate, (mixed 1,2,2,6,6-pentamethyl-4-piperidyl/tridecyl)-1,2,3,4-butanetetracarboxylate, mixed [2,2,6,6-tetramethyl-4-piperidyl/β,β,β',β'-tetramethyl-3,9-[2,4,8,10-tetraoxaspiro(5,5)undecane]diethyl]-1,2,3,4-butanetetracarboxylate, mixed [1,2,2,6,6-pentamethyl-4-piperidyl/β,β,β',β'-tetramethyl-3,9-[2,4,8,10-tetraoxaspiro (5,5)undecane]diethyl]-1,2,3,4-butanetetracarboxylate, condensates of N,N'-bis(3-aminopropyl)ethylenediamine-2,4-bis[N-butyl-N-(1,2,2,6,6-pentamethyl-4-piperidyl)

amino]-6-chloro-1,3,5-triazine, poly[6-N-morpholyl-1,3,5-triazine-2,4-diyl][(2,2,6,6-tetramethyl-4-piperidyl)imino]hexamethylene[(2,2,6,6-tetramethyl-4-piperidyl)imide], condensates of N,N'-bis(2,2,6,6-tetramethyl-4-piperidyl)hexamethylenediamine and 1,2-dibromoethane, and [N-(2,2,6,6-tetramethyl-4-piperidyl)-2-methyl-2-(2,2,6,6-tetramethyl-4-piperidyl)imino]propionamide.

The undercoat layer contains the polymer and the antioxidant, generally contains 100 parts by weight of the polymer and 0.01 to 1000 parts by weight of the antioxidant. If the antioxidant is used in an amount of less than 0.01 parts by weight, window frame unevenness cannot be sufficiently suppressed in some cases. An amount of more than 1000 parts by weight is not preferred in view of anchoring effect or appearance. When the anchoring effect or appearance is more important, the antioxidant is preferably used in an amount of 0.1 to 500 parts by weight, more preferably of 1 to 100 parts by weight. On the other hand, in terms of the effect in a reliability test at high temperature for long time period, specifically in terms of suppressing window frame unevenness in a high temperature environment, the antioxidant is preferably used in a somewhat large amount, specifically in an amount of 5 to 1000 parts by weight, more preferably of 10 to 700 parts by weight, still more preferably of 100 to 500 parts by weight.

In the process of forming the undercoat layer, a crosslinking agent may be added to the polymer. For example, a compound capable of reacting with an amino group-containing polymer may be mixed with it to crosslink it so that the strength of the undercoat layer can be increased. Examples of the compound capable of reacting with an amino group-containing polymer include epoxy compounds and the like.

The undercoat layer is formed on the optical compensation liquid crystal layer of the optical film. For example, the undercoat layer may be formed by applying a solution of an undercoating agent containing the polymer and the antioxidant by an application method such as a coating, dipping or spraying method and then drying the coating. The thickness of the undercoat layer is preferably in the range of about 10 to about 5000 nm, more preferably of 50 to 500 nm. If the undercoat layer is too thin, it cannot have properties as a bulk or cannot exhibit sufficient strength so that adequate adhesion cannot be achieved in some cases. If it is too thick, the optical properties can be degraded. The coating amount (solid volume) of the undercoat layer is preferably from 0.1 to 5 cubic centimeters per one square meter, more preferably from 0.1 to 1 cubic centimeter per one square meter, still more preferably from 0.1 to 0.5 cubic centimeters per one square meter.

While any of various pressure-sensitive adhesives such as rubber pressure-sensitive adhesives, acrylic pressure-sensitive adhesives, and silicone pressure-sensitive adhesives may be used without limitation, acrylic pressure-sensitive adhesives are generally used, because they are colorless and clear and can have good adhesion to liquid crystal cells and the like.

Acrylic pressure-sensitive adhesives comprise, as a base polymer, an acrylic polymer having a main skeleton of an alkyl (meth)acrylate monomer unit. The term "(meth)acrylate" means acrylate and/or methacrylate, and "(meth)" has the same meaning with respect to the present invention. The average carbon number of the alkyl group of the alkyl (meth)acrylate forming the main skeleton of the acrylic polymer may be about 1 to 12. Examples of the alkyl (meth)acrylate include methyl (meth)acrylate, ethyl (meth)acrylate, n-butyl (meth)acrylate, 2-ethylhexyl (meth)acrylate, isooctyl (meth)acrylate, isononyl (meth)acrylate and lauryl (meth)acrylate. Any of these may be used alone or in any combination. In particular, carbon atom of 1 to 9 alkyl (meth)acrylate is preferred.

In order to improve adhesion properties and heat resistance, at least one different monomer may be introduced into the acrylic polymer by copolymerization. Examples of copolymerizable monomers include hydroxyl group-containing monomers such as 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, and (4-hydroxymethylcyclohexyl)-methyl acrylate; carboxyl group-containing monomers such as include (meth)acrylic acid, carboxyethyl (meth)acrylate, carboxypentyl (meth)acrylate, itaconic acid, maleic acid, fumaric acid, and crotonic acid; acid anhydride group-containing monomers such as maleic anhydride and itaconic anhydride; caprolactone addition products of acrylic acid; sulfonic acid group-containing monomers such as styrenesulfonic acid, allylsulfonic acid, 2-(meth)acrylamido-2-methylpropanesulfonic acid, (meth)acrylamidopropanesulfonic acid, sulfopropyl (meth)acrylate, and (meth)acryloyloxynaphthalenesulfonic acid; and phosphate group-containing monomers such as 2-hydroxyethylacryloyl phosphate.

Nitrogen-containing vinyl monomers may also be used. Examples of such monomers for modification include maleimide, N-cyclohexylmaleimide, N-phenylmaleimide; N-acryloylmorpholine; (N-substituted) amide monomers such as (meth)acrylamide, N,N-dimethyl(meth)acrylamide, N,N-diethyl(meth)acrylamide, N-hexyl(meth)acrylamide, N-methyl(meth)acrylamide, N-butyl(meth)acrylamide, N-butyl(meth)acrylamide, N-methylol(meth)acrylamide, and N-methylolpropane(meth)acrylamide; alkylaminoalkyl (meth)acrylate monomers such as aminoethyl (meth)acrylate, aminopropyl (meth)acrylate, N,N-dimethylaminoethyl (meth)acrylate, tert-butylaminoethyl (meth)acrylate, and 3-(3-pyrimidyl)propyl (meth)acrylate; alkoxyalkyl (meth)acrylate monomers such as methoxyethyl (meth)acrylate and ethoxyethyl (meth)acrylate; and succinimide monomers such as N-(meth)acryloyloxymethylenesuccinimide, N-(meth)acryloyl-6-oxyhexamethylenesuccinimide, N-(meth)acryloyl-8-oxyoctamethylenesuccinimide, and N-acryloylmorpholine.

It is also possible to use vinyl monomers such as vinyl acetate, vinyl propionate, N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, N-vinylcarboxylic acid amides, styrene, α-methylstyrene, and N-vinylcaprolactam; cyanoacrylate monomers such as acrylonitrile and methacrylonitrile; epoxy group-containing acrylic monomers such as glycidyl (meth)acrylate; glycol acrylate monomers such as polyethylene glycol (meth)acrylate, polypropylene glycol (meth)acrylate, methoxyethylene glycol (meth)acrylate, and methoxypolypropylene glycol (meth)acrylate; and acrylate ester monomers such as tetrahydrofurfuryl (meth)acrylate, fluoro(meth)acrylate, silicone (meth)acrylate, and 2-methoxyethyl acrylate.

In particular, when an isocyanate crosslinking agent is used, the hydroxyl group-containing monomer is preferably used, because of its good reactivity with the isocyanate group. In view of adhesion to liquid crystal cells or adhesion durability, the carboxyl group-containing monomer such as acrylic acid is also preferably used. In particular, acrylic acid is preferably used.

The content of the copolymerized monomer in the acrylic polymer is preferably, but not particularly limited to, about 0.1 to about 10% by weight, more preferably about 0.5 to about 8% by weight, further more preferably about 1 to about 6% by weight.

The acrylic polymer preferably has a weight average molecular weight of about 300,000 to 2,500,000, while there is no particular limitation to its average molecular weight. The acrylic polymer may be produced by a variety of known methods, for example, by a method appropriately selected from radical polymerization methods including a bulk polymerization method, a solution polymerization method and a suspension polymerization method. A variety of known radical polymerization initiators may be used such as azo initiators and peroxide initiators. The reaction is generally performed at a temperature of about 50 to about 80° C. for a time period of 1 to 8 hours. Among the above production methods, the solution polymerization method is preferred, in which ethyl acetate, toluene or the like is generally used as a solvent for the acrylic polymer. The concentration of the solution is generally from about 20 to about 80% by weight.

The pressure-sensitive adhesive for forming the pressure-sensitive adhesive layer according to the present invention may include a crosslinking agent in addition to the base polymer. The crosslinking agent can improve adhesion to the optical film and durability and can achieve high temperature reliability or preserve the shape of the pressure-sensitive adhesive itself at high temperature. When the base polymer is an acrylic polymer, any appropriate crosslinking agent may be used, such as an isocyanate type, epoxy type, peroxide type, metal chelate type, or oxazoline type crosslinking agent. One or more of these crosslinking agents may be used alone or in any combination. The present invention is preferably applied to the case where the peroxide is contained as the crosslinking agent. Besides the peroxide crosslinking agent, the isocyanate crosslinking agent is also preferred.

Various types of peroxides may be used as the peroxide crosslinking agent. Examples of such peroxides include di(2-ethylhexyl)peroxydicarbonate, di(4-tert-butylcyclohexyl) peroxydicarbonate, di-sec-butylperoxydicarbonate, tert-butylperoxyneodecanoate, tert-hexylperoxypivalate, tert-butylperoxypivalate, dilauroyl peroxide, di-n-octanoyl peroxide, 1,1,3,3-tetramethylbutyl peroxyisobutylate, 1,1,3,3-tetramethylbutylperoxy-2-ethyl hexanoate, di(4-methylbenzoyl) peroxide, dibenzoyl peroxide, and tert-butylperoxyisobutylate. Above all, di(4-tert-butylcyclohexyl) peroxydicarbonate, dilauroyl peroxide and dibenzoyl peroxide are preferably used, because their crosslinking reaction efficiency is particularly good.

Isocyanate compounds may be used as isocyanate crosslinking agents. Examples of the isocyanate compounds include isocyanate monomers such as tolylene diisocyanate, chlorophenylene diisocyanate, hexamethylene diisocyanate, tetramethylene diisocyanate, isophorone diisocyanate, xylylene diisocyanate, diphenylmethane diisocyanate, and hydrogenated diphenylmethane diisocyanate, and adduct type isocyanate compounds produced by adding the isocyanate monomer to trimethylolpropane or the like; and isocyanurate compounds, burette type compounds, and urehthane prepolymer type isocyanates produced by addition reaction of or known polyether polyols, polyester polyols, acrylic polyols, polybutadiene polyols, polyisoprene polyols, or the like.

Examples of the epoxy crosslinking agent include bisphenol A-epichlorohydrin type epoxy resins. Examples of the epoxy crosslinking agent also include ethylene glycol diglycidyl ether, polyethylene glycol diglycidyl ether, glycerol diglycidyl ether, glycerol triglycidyl ether, 1,6-hexanediol diglycidyl ether, trimethylolpropane triglycidyl ether, diglycidylaniline, N,N,N',N'-tetraglycidyl-m-xylylenediamine, 1,3-bis(N,N-diglycidylaminomethyl)cyclohexane, N,N,N',N'-tetraglycidylaminophenylmethane, triglycidylisocyanurate, m-N,N-diglycidylaminophenyl glycidyl ether, N,N-diglycidyltoluidine, and N,N-diglycidylaniline.

The crosslinking agent may be used in an amount of 10 parts by weight or less, preferably of 0.01 to 5 parts by weight, more preferably of 0.02 to 3 parts by weight, based on 100 parts by weight of the acrylic polymer. The use of more than 10 parts by weight of the crosslinking agent can provide excessive crosslinkage to reduce the adhesion and is not preferred.

Particularly when the peroxide is used as the crosslinking agent, the amount of the peroxide is preferably about 0.05 to about 1 part by weight, more preferably from 0.06 to 0.5 parts by weight, based on 100 parts by weight of the acrylic polymer. It should be noted that when a certain peroxide is used as a polymerization initiator for the acrylic polymer and remains in the acrylic polymer, the amount of the peroxide residue should be included in the amount of the blended peroxides. When the isocyanate crosslinking agent is used in combination with the peroxide, the content of the isocyanate crosslinking agent is preferably about 0.01 to about 1.5 parts by weight, more preferably 0.02 to 1 part by weight.

If necessary, the pressure-sensitive adhesive may conveniently contain various types of additives such as tackifiers, plasticizers, fillers comprising glass fibers, glass beads, metal power, or any other inorganic powder, pigments, colorants, fillers, antioxidants, ultraviolet absorbing agents, and silane coupling agents, without departing from the object of the present invention. The pressure-sensitive adhesive layer may also contain fine particles so as to have light diffusion properties.

The pressure-sensitive adhesive layer may be formed by lamination on the undercoat layer. Examples of the forming method include, but are not limited to, methods of applying and drying a pressure-sensitive adhesive (solution) and methods of transferring the pressure-sensitive adhesive layer from a release sheet. Methods of application that may be used include roll coating methods such as reverse coating and gravure coating and other coating methods such as spin coating methods, screen coating methods, fountain coating methods, dipping methods, and spray methods.

If the pressure-sensitive adhesive layer is too thin in the pressure-sensitive adhesive optical film of the present invention, window frame unevenness can tend to occur. In the pressure-sensitive adhesive optical film of the present invention, therefore, the pressure-sensitive adhesive layer preferably has a thickness of 5 to 40 μm, more preferably a relatively small thickness of 5 to 25 μm. In addition, if the pressure-sensitive adhesive layer is relatively hard in the pressure-sensitive adhesive optical film of the present invention, window frame unevenness can tend to occur.

Examples of constituent materials of a release sheet include: proper thin items such as paper; synthetic resin films made of polyethylene, polypropylene, polyethylene terephthalate; a rubber sheet, paper, cloth, unwoven fabric, net, a foam sheet and a metal foil, and a laminate thereof. In order to enhance releasability from a pressure-sensitive adhesive layer, a release treatment imparting a low adherence, such as a silicone treatment, a long chain alkylation treatment or a fluorination treatment, may be applied onto a surface of a release sheet when required.

In order to impart antistatic properties to the pressure-sensitive adhesive optical film, an antistatic agent may also be used. The antistatic agent may be added to each layer, or alternatively, an antistatic layer may be independently formed. Examples of the antistatic agent include ionic surfactants; electrically-conductive polymers such as polyaniline, polythiophene, polypyrrole, and polyquinoxaline; and metal oxides such as tin oxide, antimony oxide and indium oxide. In particular, electrically-conductive polymers are preferably used, in view of optical properties, appearance, antistatic effect, and stability of the antistatic effect during heating or humidifying. In particular, a water-soluble or dispersible electrically-conductive polymer such as polyaniline and polythiophene is preferably used, because when the water-soluble or dispersible electrically-conductive polymer is used as an antistatic layer-forming material in the coating process, the optical film substrate can be prevented from deteriorating due to an organic solvent.

As shown in FIG. 2, the optical film according to the present invention may include, and a polarizer 6 and a transparent protective film 7 that are laminated in this order on one side of a transparent base film 1 where the optical compensation liquid crystal layer 3 is not formed.

The polarizer 6 may be bonded to the transparent base film 1 with an adhesive. While the transparent base film 1 also serves as a transparent protective film for the polarizer 6 in FIG. 2, a polarizing plate including a polarizer and a transparent protective film laminated on one or both sides of the polarizer may be laminated on the transparent base film 1.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials such as iodine, is absorbed and aligned after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As a materials forming the transparent protective film prepared on one side or both sides of the above-mentioned polarizer, with outstanding transparency, mechanical strength, heat stability, moisture cover property, isotropy, etc. may be preferable. The transparent protective film may be made of the same material as the transparent base film and may have the same thickness as the transparent base film.

The transparent base film and the transparent protective film may use the same or different polymer materials.

The polarizer, the transparent base film and the transparent protective film are generally bonded together with a water-based adhesive or the like interposed therebetween. Examples of the water-based adhesive include isocyanate adhesives, polyvinyl alcohol adhesives, gelatin adhesives, vinyl adhesives, latex adhesives, aqueous polyurethane adhesives, and aqueous polyester adhesives. Before the polarizer, the transparent base film and the transparent protective film are bonded together, the transparent base film and the transparent protective film may be subjected to activation treatment. Various methods such as saponification, corona treatment, low-pressure UV treatment, and plasma treatment may be used for the activation treatment. When the transparent base film is made of triacetylcellulose, norbornene resin, polycarbonate, or polyolefin resin, the activation treatment is particularly effective.

As the opposite side of the polarizing-adhering surface above-mentioned transparent protective film, a film with a hard coat layer and various processing aiming for antireflection, sticking prevention and diffusion or anti glare may be used.

A hard coat processing is applied for the purpose of protecting the surface of the polarization plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarization plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarization plate to disturb visual recognition of transmitting light through the polarization plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight parts to the transparent resin 100 weight parts that forms the fine concavo-convex structure on the surface, and preferably 5 to 25 weight parts. An anti glare layer may serve as a diffusion layer (viewing angle expanding function etc.) for diffusing transmitting light through the polarization plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective film.

Besides the optical film including the polarizing plate laminated, as an optical film used for the pressure-sensitive adhesive optical film of the present invention, optical layers used for forming image displays such as liquid crystal display or the like, are used. For example, optical layers, such as a reflective plate, a transflective plate, a retardation plate (a half wavelength plate and a quarter wavelength plate included), and a viewing angle compensation film, which may be used for formation of a liquid crystal display or the likes are mentioned. These are used in practice as an optical film, or as one layer or two layers or more of optical layers laminated with polarizing plate.

Especially preferable polarizing plates are; a reflection type polarization plate or a transflective type polarization plate in which a reflective plate or a transflective reflective plate is further laminated onto a polarizing plate of the present invention; an elliptically polarizing plate or a circular polarizing plate in which a retardation plate is further laminated onto the polarizing plate; or a polarizing plate in which a brightness enhancement film is further laminated onto the polarizing plate.

A reflective layer is prepared on a polarization plate to give a reflection type polarization plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarization plate may be formed using suitable methods, such as a method in which a reflective layer of metal etc. is, if required, attached to one side of a polarization plate through a transparent protective layer etc.

As an example of a reflection type polarization plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarization plate, a reflection plate may also be used as a reflective sheet constituted by preparing a reflective layer on the suitable film for the transparent film. In addition, since a reflective layer is usually made of metal, it is desirable that the reflective side is covered with a protective film or a polarization plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarization plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarization plate. That is, the transflective type polarization plate is useful to obtain of a liquid crystal display of the type that saves energy of light sources, such as a back light, in a well-lighted atmosphere, and can be used with a built-in light source if needed in a comparatively dark atmosphere etc.

A description of the above-mentioned elliptically polarization plate or circularly polarization plate on which the retardation plate is laminated to the polarization plates will be made in the following paragraph. These polarization plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called λ/4 plate) is used. Usually, half-wavelength plate (also called λ/2 plate) is used, when changing the polarization direction of linearly polarized light.

Elliptically polarization plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarization plate in which three-dimensional refractive index is controlled may also preferably compensate (prevent) coloring produced when a screen of a liquid crystal display is viewed from an oblique direction. Circularly polarization plate is effectively used, for example, when adjusting a color tone of a picture of a reflection type liquid crystal display that provides a colored picture, and it also has function of antireflection.

As retardation plates, birefringence films obtained by uniaxial or biaxial stretching polymer materials, oriented films of liquid crystal polymers, and materials in which orientated layers of liquid crystal polymers are supported with films may be mentioned. Although a thickness of a retardation plate also is not especially limited, it is in general approximately from about 20 to 150 μm.

As polymer materials, for example, polyvinyl alcohols, polyvinyl butyrals, polymethyl vinyl ethers, poly hydroxyethyl acrylates, hydroxyethyl celluloses, hydroxypropyl celluloses, methyl celluloses, polycarbonates, polyarylates, polysulfones, polyethylene terephthalates, polyethylene naphthalates, polyethersulfones, polyphenylene sulfides, polyphenylene oxides, polyallyl sulfones, polyvinyl alcohols, polyamides, polyimides, polyolefins, polyvinyl chlorides, cellulose type polymers, or bipolymers, terpolymers, graft copolymers, blended materials of the above-mentioned polymers may be mentioned. These polymer raw materials make oriented materials (stretched film) using a stretching process and the like.

As liquid crystalline polymers, for example, various kinds of polymers of principal chain type and side chain type in which conjugated linear atomic groups (mesogens) demonstrating liquid crystalline orientation are introduced into a principal chain and a side chain may be mentioned. As examples of principal chain type liquid crystalline polymers, polymers having a structure where mesogen groups are combined by spacer parts demonstrating flexibility, for example, polyester based liquid crystalline polymers of nematic orientation property, discotic polymers, cholesteric polymers, etc. may be mentioned. As examples of side chain type liquid crystalline polymers, polymers having polysiloxanes, polyacrylates, polymethacrylates, or polymalonates as a principal chain structure, and polymers having mesogen parts comprising para-substituted ring compound units providing nematic orientation property as side chains via spacer parts comprising conjugated atomic groups may be mentioned. These liquid crystalline polymers, for example, is obtained by spreading a solution of a liquid crystal polymer on an orientation treated surface where rubbing treatment was performed to a surface of thin films, such as polyimide and polyvinyl alcohol, formed on a glass plate and or where silicon oxide was deposited by an oblique evaporation method, and then by heat-treating.

A retardation plate may be a retardation plate that has a proper retardation according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The above-mentioned elliptically polarization plate and an above-mentioned reflected type elliptically polarization plate are laminated plate combining suitably a polarization plate or a reflection type polarization plate with a retardation plate. This type of elliptically polarization plate etc. may be manufactured by combining a polarization plate (reflected type) and a retardation plate, and by laminating them one by one separately in the manufacture process of a liquid crystal display. On the other hand, the polarization plate in which lamination was beforehand carried out and was obtained as an optical film, such as an elliptically polarization plate, is excellent in a stable quality, a workability in lamination etc., and has an advantage in improved manufacturing efficiency of a liquid crystal display.

The polarization plate with which a polarization plate and a brightness enhancement film are adhered together is usually used being prepared in a backside of a liquid crystal cell. A brightness enhancement film shows a characteristic that reflects linearly polarization light with a predetermined polarization axis, or circularly polarization light with a predetermined direction, and that transmits other light, when natural light by back lights of a liquid crystal display or by reflection from a back-side etc., comes in. The polarization plate, which is obtained by laminating a brightness enhancement film to a polarization plate, thus does not transmit light without the predetermined polarization state and reflects it, while obtaining transmitted light with the predetermined polarization state by accepting a light from light sources, such as a backlight. This polarization plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarization plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported; etc. may be mentioned.

Therefore, in the brightness enhancement film of a type that transmits a linearly polarized light having the above-mentioned predetermined polarization axis, by arranging the polarization axis of the transmitted light and entering the light into a polarization plate as it is, the absorption loss by the polarization plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarization plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarization plate may consist of multi-layered film of laminated layers of a polarization plate and two of more of optical layers as the above-mentioned separated type polarization plate. Therefore, a polarization plate may be a reflection type elliptically polarization plate or a semi-transmission type elliptically polarization plate, etc. in which the above-mentioned reflection type polarization plate or a transflective type polarization plate is combined with above described retardation plate respectively.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly-workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

In addition, ultraviolet absorbing property may be given to the above-mentioned each layer of the optical film, and the adhesive layer etc., of the pressure-sensitive adhesive optical film of the present invention, using a method of adding UV absorbents, such as salicylic acid ester type compounds, benzophenol type compounds, benzotriazol type compounds, cyano acrylate type compounds, and nickel complex salt type compounds.

The pressure-sensitive adhesive optical film of the present invention is preferably used to form various types of image displays such as liquid crystal displays. Liquid crystal displays may be formed according to conventional techniques. Specifically, liquid crystal displays are generally formed by appropriately assembling a liquid crystal cell and the pressure-sensitive adhesive optical film and optionally other components such as a lighting system and incorporating a driving circuit according to any conventional technique, except that the optical film of the present invention is used. Any type of liquid crystal cell may also be used such as a TN type, an STN type and a π type.

Suitable liquid crystal displays, such as liquid crystal display with which the above pressure-sensitive adhesive optical film has been located at one side or both sides of the liquid crystal cell, and with which a backlight or a reflective plate is used for a lighting system may be manufactured. In this case, the optical film may be installed in one side or both sides of the liquid crystal cell. When installing the optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, a organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarization plate, while preparing the polarization plate on the surface side of the transparent electrode.

Since the retardation plate and the polarization plate have function polarizing the light that has entered as incident light from outside and has been reflected by the metal electrode, they have an effect of making the mirror surface of metal electrode not visible from outside by the polarization action.

If a retardation plate is configured with a quarter wavelength plate and the angle between the two polarization directions of the polarization plate and the retardation plate is adjusted to π/4, the mirror surface of the metal electrode may be completely covered.

This means that only linearly polarized light component of the external light that enters as incident light into this organic EL display is transmitted with the work of polarization plate. This linearly polarized light generally gives an elliptically polarized light by the retardation plate, and especially the retardation plate is a quarter wavelength plate, and moreover when the angle between the two polarization directions of the polarization plate and the retardation plate is adjusted to π/4, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarization plate, it cannot be transmitted through the polarization plate. As the result, mirror surface of the metal electrode may be completely covered.

EXAMPLES

The present invention is more specifically described with some examples below which are not intended to limit the scope of the present invention. In each example, "part," "parts" and "%" are all by weight.

Example 1

Preparation of Acrylic Pressure-Sensitive Adhesive

A solution (15.5% in solids content) was used that contained, as a base polymer, an acrylic polymer with a weight average molecular weight of 1,650,000 comprising a copolymer of butyl acrylate and 4-hydroxybutylethyl acrylate (99:1 in weight ratio), in which 0.3 parts of 2,2'-azobisisobutyronitrile was used as a polymerization initiator based on 100 parts of the monomers. Based on 100 parts of the solids of the acrylic polymer solution, 0.3 parts of dibenzoyl peroxide (NYPER BMT-40SV manufactured by NOF CORPORATION) and 0.02 parts of trimethylolpropanexylenediisocyanate (TAKENATE D110N manufactured by Mitsui Takeda Chemicals, Inc.) serving as crosslinking agents, and 0.2 parts of an acetoacetyl group-containing silane coupling agent (A-100 manufactured by Soken Chemical & Engineering Co., Ltd.) were added to the acrylic polymer solution so that a pressure-sensitive adhesive solution (12% in solids content) was prepared.

(Formation of Pressure-Sensitive Adhesive Layer)

The resulting pressure-sensitive adhesive solution was applied by reverse roll coating to a separator made of a release-treated polyester film (38 μm in thickness) such that the pressure-sensitive adhesive layer would have a thickness of 20 μm after drying, and then heated at 155° C. for 3 minutes for solvent vaporization so that a pressure-sensitive adhesive layer was obtained.

(Optical Film)

Wide View (WV) Film manufactured by Fuji Photo Film Co., Ltd. was used. WV Film included a transparent base film of a cellulose polymer film and a discotic liquid crystal layer that was provided on the film and composed of obliquely aligned discotic liquid crystal molecules.

The obliquely-aligned discotic liquid crystal molecule layer was separated from WV Film, and properties were measured at a wavelength (λ) of 590 nm with KOBRA-21ADH manufactured by Oji Scientific Instruments. The maximum in-plane refractive index was represented by nx, the refractive index in a direction perpendicular to the direction of the maximum in-plane refractive index was represented by ny, and the refractive index in the thickness direction was represented by nz. The thickness was represented by d. The transparent support had a Δnd value (=(nx−ny)d) of 12 nm and an Rth value (=(nx−nz)d) of 100 nm. On the other hand, the obliquely aligned layer was measured for retardation, while the angle of incidence was changed from −50° to 50° with respect to the direction of the tilted optical axis. As a result, the obliquely aligned layer had a Δnd value of 30 nm, an Rth value of 150 nm and an average tilt angle θ of 17°.

The transparent base film side of the WV Film was saponified, and then the saponified surface was bonded to a 20 μm-thick polyvinyl alcohol-based polarizer (SEG-5424WL manufactured by Nitto Denko Corporation) with a polyvinyl alcohol-based adhesive. The other side of the polarizer was bonded to a transparent protective film (an 80 μm-thick triacetylcellulose film) with the same polyvinyl alcohol-based adhesive so that an optical film having a polarizing plate, that is a polarizing plate with an optical compensation layer, was prepared.

(Preparation of Undercoating Agent)

An acrylate having a primary amino end group (Polyment NK380 manufactured by Nippon Shokubai Co., Ltd.) was diluted with toluene to form a solution with a solids content of 2%. Based on 100 parts of the solids of the solution, 1 part of a phenolic antioxidant (Irganox 1010 manufactured by Ciba Specialty Chemicals Inc.) was added to the solution so that an undercoating agent was prepared.

(Preparation of Pressure-Sensitive Adhesive Optical Film)

The undercoating agent was applied with a bar coater to the surface of the discotic liquid crystal layer of the polarizing plate with the optical compensation layer and then dried to form an undercoat layer (80 nm in thickness) with a coating amount of 0.2 cubic centimeters. The release sheet with the pressure-sensitive adhesive layer formed thereon was then bonded to the undercoat layer so that a pressure-sensitive adhesive optical film was prepared.

Examples 2 to 7

Pressure-sensitive adhesive optical films were prepared using the process of example 1, except that the amount of the addition of the phenolic antioxidant was changed as shown in Table 1 in the preparation of the undercoat layer.

Example 8

A pressure-sensitive adhesive optical film was prepared using the process of example 1, except that a phenolic antioxidant (Irganox 1010 manufactured by Ciba Specialty Chemicals Inc.) and a phosphorus antioxidant (Irganox B225 manufactured by Ciba Specialty Chemicals Inc.), with weight ratio of the phenolic antioxidant:the phosphorus antioxidant=1:1, were added in a total amount of 1 part to the solution, based on 100 parts of the solids of the solution.

Comparative Example 1

A pressure-sensitive adhesive optical film was prepared using the process of example 1, except that the phenolic antioxidant was not added in the preparation of the undercoat layer.

Comparative Example 2

A pressure-sensitive adhesive optical film was prepared using the process of example 1, except that the phenolic antioxidant was not added when the undercoat layer was prepared and that 1 part of a phenolic antioxidant (Irganox 1010 manufactured by Ciba Specialty Chemicals Inc.) was added to the pressure-sensitive adhesive solution, based on 100 parts of the solids of the pressure-sensitive adhesive solution, when the acrylic pressure-sensitive adhesive was prepared.

The pressure-sensitive adhesive optical films obtained as described above were evaluated as described below. The results are shown in Table 1.

(Window Frame Unevenness)

The release-treated polyester film was removed from the resulting pressure-sensitive adhesive optical film (300 mm×220 mm in size), and the resulting pressure-sensitive adhesive optical film sample was bonded to a test glass substrate using a roller. The test glass substrate used was a non-alkali glass plate (0.7 mm in thickness, 350 mm×250 mm in size). After the bonding, the sample was placed in an autoclave (50° C., 5 atm×15 minutes). Thereafter, a window frame test was performed. In the window frame test, a backlight was tuned on in an atmosphere at 80° C., and the sample was placed on the backlight. Whether window frame unevenness was generated in the peripheral portion of the optical film (within 10 mm from the edge) or not was visually evaluated according to the criteria below. The observation was performed after a lighting time of 0, 120 or 240 hours.

O: There is no unevenness in the peripheral portion.
Δ: Unevenness in the peripheral portion is slightly observed in a dark place.
x: Unevenness in the peripheral portion is clearly observed in a dark place.
xx: Unevenness in the peripheral portion is slightly observed in a bright place.
xxx: Unevenness in the peripheral portion is clearly observed in a bright place

TABLE 1

| | Amount (Parts by Weight) of Antioxidant Based on 100 Parts by Weight of Polymer | | Window Frame Unevenness | | | |
|---|---|---|---|---|---|---|
| | Undercoat Layer | Pressure-Sensitive Adhesive Layer | 0 Hour | 120 Hours | 240 Hours | 500 Hours |
| Example 1 | 1 | 0 | o | o | o | x |
| Example 2 | 10 | 0 | o | o | o | Δ |
| Example 3 | 50 | 0 | o | o | o | Δ |
| Example 4 | 100 | 0 | o | o | o | o |
| Example 5 | 125 | 0 | o | o | o | o |
| Example 6 | 150 | 0 | o | o | o | o |
| Example 7 | 500 | 0 | o | o | o | o |
| Example 8 | 1 | 0 | o | o | Δ | xx |
| Comparative Example 1 | 0 | 0 | o | Δ | x | xxx |
| Comparative Example 2 | 0 | 1 | o | Δ | x | xxx |

What is claimed is:

1. A pressure-sensitive adhesive optical film, comprising:
an optical film comprising a transparent base film and an optical compensation liquid crystal layer provided on one side of the transparent base film;
a pressure-sensitive adhesive layer provided on the optical compensation liquid crystal layer; and
an undercoat layer that is interposed between the optical compensation liquid crystal layer and the pressure-sensitive adhesive layer and contains a polymer and an antioxidant,
wherein the pressure-sensitive adhesive layer is an acrylic pressure-sensitive adhesive layer, and the polymer of the undercoat layer has a primary amino group, and
wherein the undercoat layer contains 100 parts by weight of the polymer and 100 to 1000 parts by weight of the antioxidant.

* * * * *